Figure 1:
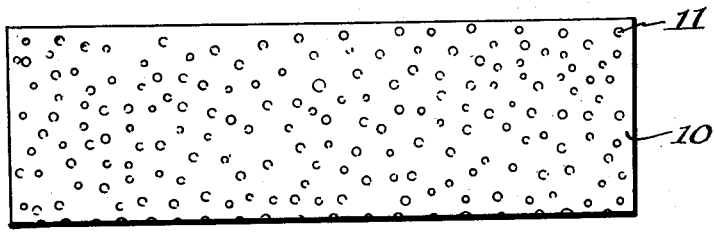

Jan. 23, 1934.  J. V. O. PALM  1,944,609
BEARING MANUFACTURE
Filed Oct. 1, 1930

Inventor
John V. O. Palm
By Fay, Oberlin & Fay
Attorneys

Patented Jan. 23, 1934

1,944,609

UNITED STATES PATENT OFFICE 1,944,609

BEARING MANUFACTURE

John V. O. Palm, Cleveland Heights, Ohio, assignor to The Cleveland Graphite Bronze Company, Cleveland, Ohio, a corporation of Ohio Application October 1, 1930. Serial No. 485,699

9 Claims. (Cl. 29—149.5)

This invention, relating, as indicated, to bearing manufacture is more particularly directed to a novel method of producing journal bearings, as distinguished from ball and roller bearings.

Ordinarily, the housings which receive bearings are castings and the bearing material which may be babbitt is poured against the housing, this process being quite costly because of the fact that the babbitt must be of considerable thickness, due to the irregularity of the cast housing surface, and also because the housings are sometimes of relatively large proportions, and placing them in a position to line with babbitt is an expensive and awkward process. The thick layer of babbitt in such bearings of the prior art is also objectionable because babbitt is soft and a thick layer is subject to distortion from radial pressure more easily than a thin lining of babbitt backed with hard material.

A second well known method, which has supplanted to a large extent the above mentioned pouring method, in the bearing industry is to line a thick layer of brass with babbitt, but the resulting bearing is very expensive because of the cost of the brass. It has been found that steel may be lined with babbitt or bronze, and that the thickness of the steel as compared with that of the brass may be materially reduced. The resulting bearing is very cheap to produce as far as the materials are concerned but the problem is how to unite these to metals, which have such different properties, so that the cost of such union plus the cost of materials is less than the total cost of a lined housing or a lined brass backed bearing. I have found that either bronze, or babbitt, or other suitable bearing material in the form of strips may be united to steel, and that this thickness of the babbitt or equivalent bearing material may be materially reduced and yet such a bearing will outlast a thick, cast bearing, and in the event of replacement the cost is only a fraction of what it would be under former conditions.

A further and important objection to replacing worn out bearings by casting is that the process of casting, being carried out in small shops under all sorts of conditions, produces a bearing lining the structure of which is far from uniform as compared to a lining produced in the factory under controlled conditions, where the bearing has a structure of just the desired character. This will be appreciated by taking the main bearing of an automobile, for example, which is usually cast in the block. If this bearing becomes worn the block has to be taken out, all the old babbitt removed, and then the bearing housing is cast with babbitt. With the use of my improved thin wall bearings all of this labor is avoided and the cost of material is less, since part of the space which was formely occupied by babbitt, a very expensive material, is now taken up by steel. The reference to the use of my bearing in an automobile is only intended as a means of illustration and I do not wish to be limited to the use of my improved bearing in automobiles.

The invention involved herein is directed to the provision of a bearing consisting of a layer of bearing backing material and bearing lining material united by means of die casting, that is, by forcing fluid or plastic metal under extreme pressure into a metal mold. I have found that it is possible to die cast babbitt upon steel and bond the babbitt to the steel without the aid of solder, tin or other metallic adhesives, and that the process may be carried out upon a flat strip of steel which is subsequently bent or pressed to form, and that after such bending the bond is not disturbed.

I have also found that it is possible to die cast babbitt in such a manner against a perfectly flat strip of steel as well as one which has been treated to provide an anchorage for the babbitt, such treatment consisting in indenting, scarifying or otherwise forming retaining voids in one surface of the steel. It will be noted that I have used the terms "steel" and "babbitt", but these terms are used only for purposes of illustration, as other metals may be combined in the same.

The annexed drawing and the following description set forth in detail one method and certain mechanism embodying the invention, such disclosed method and means constituting, however, but one of various mechanical forms in which the principle of the invention may be used.

In said annexed drawing:—

Figure 2:
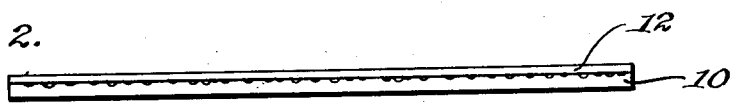
Figure 3:
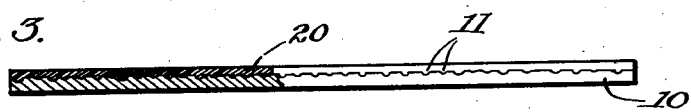
Figure 4:
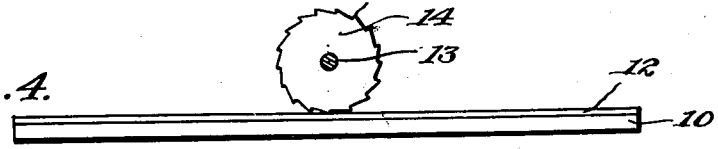
Figure 5:
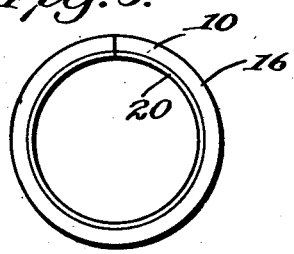
Figure 6:
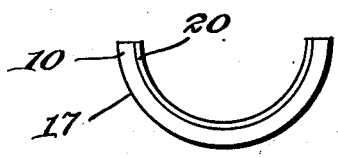

Fig. 1 is a plan view of a strip of steel which has been surface treated; Fig. 2 is a side elevation showing a layer of babbitt ready to be die cast; Fig. 3 is a side elevation similar to Fig. 2 with parts in section taken after the die casting operation; Fig. 4 is a side elevation showing the machining operation; Fig. 5 is an end view of a full round bearing; and Fig. 6 is an end view of a half round bearing.

Referring now to the drawing, a strip of steel 10 will be seen to have indentations 11, which in this instance have been caused by shot blasting, however, the strip may be treated in any well known manner to provide an anchorage for the babbitt or in some instances, as hereinbefore stated, the strip does not have to be treated at all and the babbitt will adhere thereto, due to the peculiar reaction of the babbitt when die cast. A fluid or plastic layer of babbitt is shown at 12, Fig. 2, which is acted upon by a die (not shown) to produce a layer which is thicker than desired, shown at 20. The reason for casting a thicker layer will be apparent when it is remembered that the object is to produce a bi-metal bearing in which the layer of babbitt is extremely thin yet of uniform structure. By casting a thick layer and then reducing the thickness to the desired size a bearing blank may be produced which will have exactly the same thickness throughout its extent, and this may be attained regardless of the variation in thickness of the steel strip. This method of providing an excessive layer of babbitt does not have to be followed in every instance as it is only designed for use in cases where extreme accuracy is essential. It will be noted that portions of the babbitt are imbedded in the openings 11 which provide a mechanical means of gripping the lining babbitt and holding it securely to the steel.

The die casting operation causes considerable heat to be generated, and this heat is distributed throughout the layers 10 and 20 of the composite bearing, whereupon the excess of babbitt is machined off by the teeth 15 on the machining roller 14 which revolves about a shaft 13. This action cuts the layer 12 down to the desired size and enables me to bend the strip into either whole, round or half round bearings. The heat generated by the die casting operation referred to above is not totally lost during the machining operation and assists in the bending operation so that together with the thinness of the babbitt no danger of rupturing the bond is incurred. In some instances it has been found practical to die cast an extremely thin layer of babbitt so that the machining operation can be omitted and the bearings can very easily be formed into shape because of the high degree of heat which they obtain from the die casting operation, provided of course that the forming operation is performed immediately after the die casting operation As far as I am aware I am the first to provide a bearing consisting solely of two layers of metal which are joined together by die casting, there being no other means present to maintain the layers in a bonded relation, and from the above description it will be apparent that I have provided a bearing and a process of making the same in which not elaborate or expensive machinery is necessary, and in which babbitt is bonded to steel without the aid of solder or similar bonding agents. The process itself will be noted to have a very important further advantage in that the bearing is practically completed while in a flat condition, whereas most present day bearings are first formed into cylinders, then dipped and then coated with babbitt, said last named babbitting operation being quite difficult of performance upon curved surfaces when compared to the same operation upon flat surfaces.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. In the method of manufacturing bearings, the steps which consist in indenting a strip of bearing backing metal, casting under high pressure a layer of fluid bearing lining metal upon said indented surface and then forming the resulting composite flat strip into cylinders.

2. In the method of manufacturing bearings, the steps which consist in indenting a strip of bearing backing metal, casting under high pressure a layer of fluid bearing lining metal upon said indented surface in excessive amounts, reducing said excessive layer to a relatively thin layer and then forming the resulting composite flat strip into cylinders.

3. In the method of manufacturing bearings, the steps which comprise casting under high pressure a layer of fluid bearing lining metal upon a strip of bearing backing metal, said bearing lining metal being excessively thick, reducing the thickness of said bearing lining metal and then forming the composite strip into bearings.

4. In the method of manufacturing bearings, the steps which consist in indenting a strip of steel, casting under high pressure a layer of fluid babbitt upon said indented surface and then forming the resulting composite flat strip into cylinders.

5. In the method of manufacturing bearings, the steps which consist in indenting a strip of steel, casting under high pressure a layer of fluid babbitt upon said indented surface, in excessive amounts, reducing said excessive layer to a relatively thin layer and then forming the composite flat strip into cylinders.

6. In the method of manufacturing bearings, the steps which comprise casting under high pressure a layer of fluid babbitt upon a strip of steel, said babbitt being excessively thick, reducing the thickness of said babbitt and then forming the composite strip into bearings.

7. In the method of manufacturing bearings, the steps which consist in indenting a strip of bearing backing metal, placing said strip in a metal mold and then casting a layer of fluid bearing metal under high pressure upon said strip.

8. The method of manufacturing bearings, the step which consists in placing a strip of bearing backing metal in a metal mold and then casting a layer of fluid bearing metal under high pressure upon said strip.

9. In the method of manufacturing bearings, the step which consists in placing a strip of bearing backing metal in a metal mold, casting a relatively thick layer of fluid bearing metal under high pressure upon said strip, and then reducing the thickness of said layer of bearing metal.

JOHN V. O. PALM.